United States Patent [19]
Adeff

[11] Patent Number: 5,890,881
[45] Date of Patent: Apr. 6, 1999

[54] PRESSURE BALANCED TURBOCHARGER ROTATING SEAL

[75] Inventor: George A. Adeff, Los Angeles, Calif.

[73] Assignee: AlliedSignal Inc., Morristown, N.J.

[21] Appl. No.: 774,327

[22] Filed: Nov. 27, 1996

[51] Int. Cl.[6] .............................. F01D 11/00; F02B 37/00
[52] U.S. Cl. .......................................... 417/407; 415/111
[58] Field of Search ............................ 417/407; 415/111, 415/112

[56] References Cited

U.S. PATENT DOCUMENTS

| | | |
|---|---|---|
| 2,822,974 | 2/1958 | Mueller . |
| 2,918,207 | 12/1959 | Moore . |
| 3,090,546 | 5/1963 | Woollenweber ........................ 417/407 |
| 3,411,706 | 11/1968 | Woollenweber et al. . |
| 3,565,497 | 2/1971 | Miller . |
| 3,693,985 | 9/1972 | Dillner . |
| 4,157,834 | 6/1979 | Burdette . |
| 4,196,910 | 4/1980 | Aizu . |
| 4,268,229 | 5/1981 | Berg . |
| 4,377,290 | 3/1983 | Netzel . |
| 4,389,052 | 6/1983 | Shimizu et al. . |
| 4,420,160 | 12/1983 | Laham . |
| 4,613,288 | 9/1986 | McInerney . |
| 4,725,206 | 2/1988 | Glaser et al. . |
| 4,986,733 | 1/1991 | Fleury et al. . |
| 5,145,334 | 9/1992 | Gutknecht . |
| 5,176,497 | 1/1993 | Deacon et al. . |

FOREIGN PATENT DOCUMENTS

| | | |
|---|---|---|
| 0 035891 A | 9/1981 | European Pat. Off. . |
| 0 357246 A | 3/1990 | European Pat. Off. . |
| 0 374713 A | 6/1990 | European Pat. Off. . |
| 2257188 A | 6/1974 | Germany . |
| 2437530 | 2/1976 | Germany ........................ 417/407 |
| 2911682 | 10/1980 | Germany ........................ 417/407 |
| 373932 A | 5/1989 | Germany . |
| 1124203 | 8/1968 | United Kingdom . |

Primary Examiner—Michael Koczo
Attorney, Agent, or Firm—Felix L. Fischer

[57] ABSTRACT

A pressure balanced turbocharger rotating seal is provided by two piston rings mounted on the shaft of the turbocharger, one of the rings engaging a circumferential surface of the shaft bore in the center housing and the second ring engaging a circumferential surface of the shaft bore in the turbine wheel shroud, with a passage for introducing pressurizing gas intermediate the two rings, the passage including a circumferential channel in the inner face of the turbine wheel shroud, and a compression seal engaged between the center housing and turbine wheel shroud outboard of the channel.

14 Claims, 3 Drawing Sheets

PRESSURE BALANCED TURBOCHARGER ROTATING SEAL

BACKGROUND OF THE INVENTION

1. Field of the Invention

This invention relates generally to turbocharger shaft seal arrangements. More particularly, a pressure balanced dual piston ring configuration on the shaft in combination with a compression seal engaged between the center housing and turbine wheel shroud provides an effective turbine end seal for avoiding contamination by condensates and vapor in the exhaust gas driving the turbine.

2. Description of the Related Art

Turbochargers are being employed in numerous applications including conventional internal combustion engine charge air boosting and new concepts for turbopumping of exhaust gases and pressurizing reactants for power generation systems such as fuel cells. In most turbochargers operational requirements dictate the need for relatively leak-free seals between the shaft bearings within the center housing, and the rotating turbine and compressor wheels. This is particularly true at the turbine end of the shaft, since the turbine typically operates in a relatively high temperature environment. Accordingly, it is desirable to prevent leakage of bearing lubricant into the turbine housing to prevent gumming or coking of the lubricant in high temperature applications, which can detrimentally affect the turbine performance and further to prevent partial ignition of the lubricant within the turbine housing or blow through of the lubricant, either of which creates adverse effects on the level of pollutants discharged by the system. Similarly, avoiding contamination of the inlet compression gas stream by lubricant from the center housing is important.

In many applications, the requirement exists for significantly reduced contamination of the compression gas stream over the available art and avoiding contamination of the turbocharger lubricating oil by water vapor, condensates or other corrosive effluents in the exhaust gas stream driving the turbine of the turbocharger. The prior art typically employs one or more sealing rings on the turbine shaft in a labyrinth arrangement for preventing leakage on one or both the turbine and compressor sides of the shaft. Additionally, venting the compressor end seal within the center housing to allow lubricant contacting the seal to drain and slinger arrangements on the shaft for pumping excess lubricant radially away from the seal rings are employed for increasing, efficiency of the overall seal configuration. These prior art configurations, singly and in various combinations have not demonstrated sufficient sealing capability for new high efficiency sealing requirements.

The present invention provides increased sealing effectiveness over the prior art by combining plural sealing elements with an integral pressure balancing cavity receiving pressurizing gas from the compressed gas stream or an external source.

SUMMARY OF THE INVENTION

The present invention provides a seal for a turbine shaft wheel employed in a turbocharger comprising first and second piston rings mounted on the shaft, the first ring sealingly engaging a circumferential surface of the shaft bore in the center housing casting and the second ring sealingly engaging a circumferential surface of the shaft bore in the turbine wheel shroud. A passage having a portion integral to the center housing for introducing a pressurizing gas, communicates with the shaft bore intermediate the first and second piston rings, with a second portion of the passage including a circumferential channel in the inner face of the turbine wheel shroud. An O-ring seal engaged between the center housing and turbine wheel shroud outboard of the channel completes the seal on the turbine end of the shaft.

A positive face seal on the compressor end of the shaft, in combination with the pressure balanced twin seal ring and compression seal arrangement of the turbine end provides efficacious seals for preventing contamination of the compression gas stream and avoiding contamination of the lubricant respectively.

In alternative embodiments requiring, higher temperature capability for the turbine, the O-ring seal is replaced with an appropriate high temperature compression seal.

BRIEF DESCRIPTION OF THE DRAWINGS

The details and features of the present invention will be more clearly understood with respect to the detailed description and drawings in which.

DETAILED DESCRIPTION OF THE INVENTION

Figure 1:
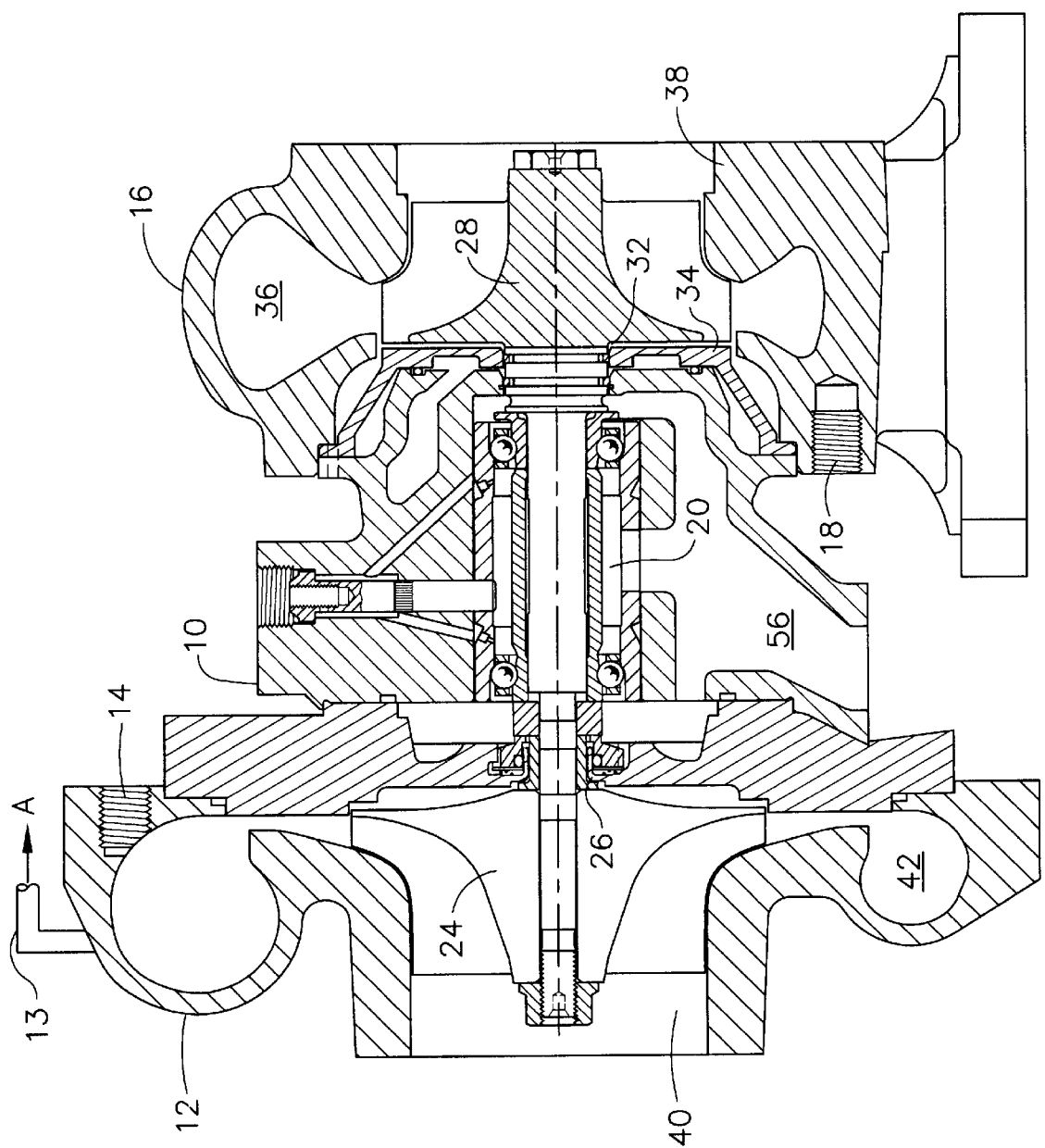
FIG. 1 is a side section view of a turbocharger employing the present invention.
Figure 2:
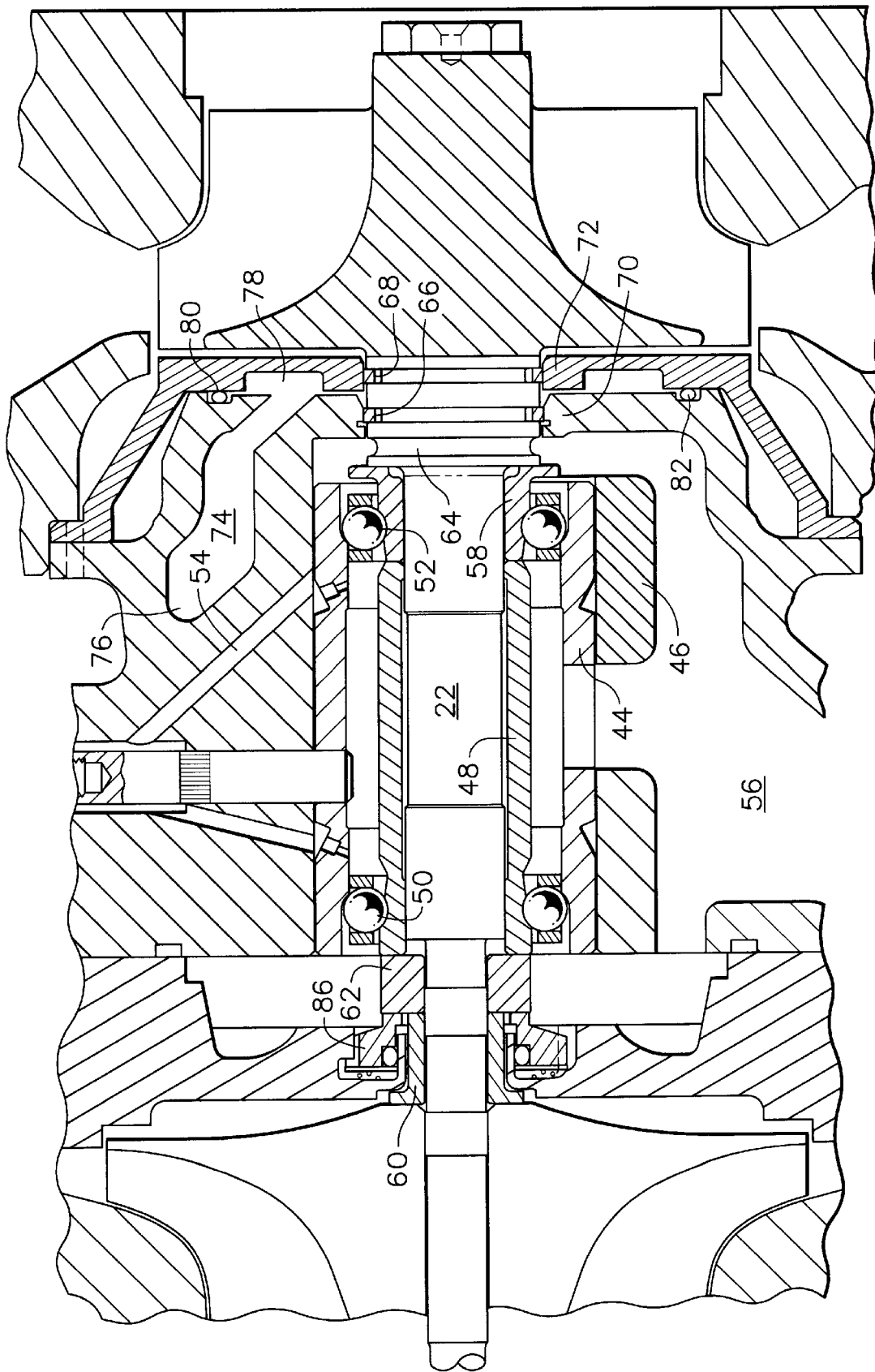
FIG. 2 is a detailed section view of the center housing of the turbocharger of FIG. 1 showing the elements of the present invention in a current embodiment.

Referring to the drawings, FIG. 1 shows a turbocharger embodiment employing the present invention which includes a center housing 10, a compressor housing 12 connected to the center housing by bolts (not shown) received in threaded holes 14 or other conventional means, and a turbine housing 16 connected to the center housing with bolts (not shown) received in threaded holes 18. A bearing assembly, generally designated 20, is carried within the center housing and a shaft 22 is engaged by a center bore of the bearing. A compressor wheel 24 is mounted on one end of the shaft which extends through a first bore 26 in the compressor end of the center housing concentric with the center bore. A turbine wheel 28 is mounted on the second end of the shaft which extends through a second bore 30, also concentric with the center bore, in the turbine end of the center housing and a third bore 32, also concentric with the center bore, in a turbine wheel shroud 34. The turbine wheel shroud (defined in alternative embodiments as a turbine backface or heat shield) is mounted to the center housing or constrained between the center housing and turbine housing for the embodiment shown in the drawings. The first, second and third bores and the center bore of the bearing collectively comprise a shaft bore for the turbocharger.

The turbocharger operates conventionally with expansion gas provided through a volute 36 in the turbine housing to aerodynamically drive the turbine, exhausting through outlet 38 in the turbine housing. Rotation of the turbine is carried through the shaft to rotate the compressor wheel, drawing compression gas through the inlet 40 in the compressor housing with compressed gas exiting the compressor into volute 42 for communication to an engine inlet manifold or other compressed gas user.

For the embodiment shown in the drawings, the bearing system includes a bearing outer ring 44 received within a bearing carrier 46. A bearing inner ring 48 which is mounted for rotation with the shaft, is supported by axially separated sets of roller bearing elements 50 and 52. Lubricating oil injection channels, generally designated 54 and a collection sump 56 constitute the lubrication system for the bearings and shaft. Compressive loads are carried by a collar 58 on the turbine end of the shaft and collar 60 and ring 62 on the compressor end of the shaft. For the embodiment shown in the drawings, thrust loads are carried by the roller bearing elements. In alternative embodiments of the present invention, journal bearings and associated thrust bearings are employed as the bearing system for the shaft. Contouring of the turbine end of the shaft, generally designated 64 provides a slinger effect for oil collection.

First and second seal rings 66 and 68 mounted on the shaft, provide a multi-element seal with the first ring sealingly engaging a circumferential surface 70 of the second bore 30 in the center housing and the second ring sealingly engaging a circumferential surface 72 of the third bore 32 in the turbine wheel shroud. A passage 74 having a first portion 76 integral to the center housing for introducing a pressurizing gas, communicates with the shaft bore intermediate the first and second piston rings, with a second portion of the passage including a circumferential channel 78 in the inner face 80 of the turbine wheel shroud. An O-ring seal 82 engaged between the center housing and turbine wheel shroud outboard of the channel completes the seal on the turbine end of the shaft.

Figure 3:
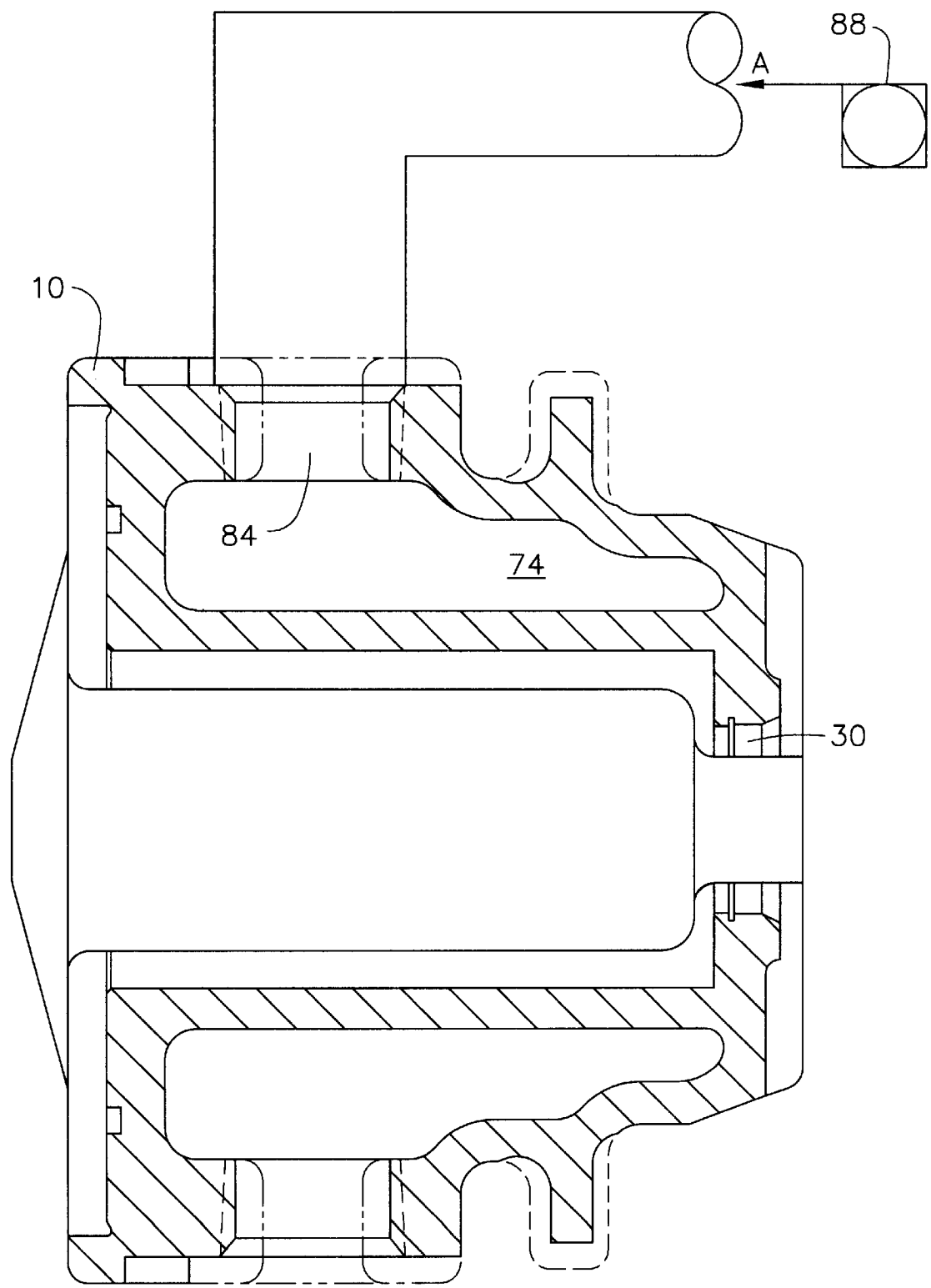
FIG. 3 is a detailed top section view of the turbocharger center housing of FIG. 1 showing the pressure port a schematic representation of the pressurizing gas sources.

Pressurizing gas is provided to passage 74 through port 84, as shown in FIG. 3, which is connected to an external source such as compressed brake air tank in a vehicle application, independent pressurized gas tanks or fed from the compressor volute of the turbocharger, through further downstream in the gas supply system. Each of these alternatives is shown schematically in FIGS. 1 and 3. The first portion 76 of passage 74 is integrally cast in the center housing for the embodiment shown in the drawings, and extends to the turbine end face of the center housing. The circumferential channel 78 carries the pressurizing gas for equal distribution around the shaft between the seal rings through the clearance gap between the end face and turbine wheel shroud. The pressurizing gas at a higher absolute pressure than the expansion gas in the turbine provides a pressure gradient across the outer seal ring precluding transmission of contaminants such as water vapor, corrosive condensates or other potential contaminants from the expansion gas to the lubricating system for the turbocharger. Similarly, the pressure established between the seals provides a gradient across the inner seal ring assisting the labyrinth configuration of the structure of the seal in precluding leakage of lubricating oil into the turbine housing.

A positive face seal 86 is provided on the compressor end of the shaft, which in combination with the pressure balanced twin seal ring and compression seal arrangement of the turbine end provides an efficacious seal for preventing contamination of the compression gas stream. An exemplary seal for use on the compressor end of the shaft is a carbon face seal such as that disclosed in U.S. Pat. No. 4,420,160 entitled "Face Seal System" issued Dec. 13, 1983 to Herman C. Laham and having a common assignee with the present application.

In alternative embodiments requiring higher temperature capability for the turbine, the O-ring seal is replaced with an appropriate high temperature compression seal such as a compressible metal ring.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A seal for a turbine wheel shaft employed in a turbocharger comprising:

a shaft supporting a turbine wheel and a compressor wheel, said shaft rotatably retained within a shaft bore extending through a center housing and a turbine wheel shroud;

first and second seal rings mounted on the shaft proximate the turbine wheel, the first ring sealingly engaging a circumferential surface of the shaft bore in the center housing and the second ring sealingly engaging a circumferential surface of the shaft bore in the turbine wheel shroud;

a passage for introducing a pressurizing gas, the passage communicating with the shaft bore intermediate the first and second piston rings;

means for supplying pressurizing gas to the passage; and a compression seal engaged between the center housing and turbine wheel shroud outboard of the passage.

2. A seal as defined in claim 1 wherein the passage includes a first portion integral with the center housing and a second portion comprising a circumferential channel 78 in the inner face of the turbine wheel shroud.

3. A seal as defined in claim 1 wherein the compression seal comprises an O-ring.

4. A seal as defined in claim 1 wherein the compression seal comprises a deformable metallic ring.

5. A seal as defined in claim 2 wherein the center housing, is a casting and the first portion of the passage is integrally cast with the center housing.

6. A seal as defined in claim 2 wherein the means for supplying pressurizing gas comprises a port in the center housing operably interconnected to the first portion of the passage and a pressurized gas source.

7. A seal as defined in claim 6 wherein the pressurized gas source comprises a pressure take-off from a volute receiving compressed gas from the compressor wheel.

8. A seal as defined in claim 6 wherein the pressurized gas source comprises a compressed gas tank.

9. A seal system for a turbine wheel and compressor wheel shaft employed in a turbocharger comprising:

a shaft supporting a turbine wheel and a compressor wheel, said shaft rotatably retained within a shaft bore extending through a center housing and a turbine wheel shroud;

first and second seal rings mounted on the shaft proximate the turbine wheel, the first ring sealingly engaging a circumferential surface of the shaft bore in the center housing and the second ring sealingly engaging a circumferential surface of the shaft bore in the turbine wheel shroud;

a passage for introducing a pressurizing gas, the passage communicating with the shaft bore intermediate the first and second piston rings;

means for supplying pressurizing as to the passage;

a compression seal engaged between the center housing and turbine wheel shroud outboard of the passage; and a positive face seal operatively engaging the shaft proximate the compressor wheel.

10. A seal system as defined in claim 9 wherein the passage includes a first portion integral with the center housing and a second portion comprising a circumferential channel in the inner face of the turbine wheel shroud.

11. A seal as defined in claim 10 wherein the center housing is a casting and the first portion of the passage is integrally cast with the center housing.

12. A seal as defined in claim 10 wherein the means for supplying pressurizing gas comprises a port in the center housing operably interconnected to the first portion of the passage and a pressurized gas source.

13. A seal as defined in claim 12 wherein the pressurized gas source comprises a pressure take-off from a volute receiving compressed gas from the compressor wheel.

14. A seal as defined in claim 12 wherein the pressurized gas source comprises a compressed gas tank.

* * * * *